United States Patent
Koshy et al.

(10) Patent No.: US 11,343,244 B2
(45) Date of Patent: May 24, 2022

(54) METHOD AND APPARATUS FOR MULTI-FACTOR VERIFICATION OF A COMPUTING DEVICE LOCATION WITHIN A PRESET GEOGRAPHIC AREA

(71) Applicant: Dell Products, LP, Round Rock, TX (US)

(72) Inventors: Kamal J. Koshy, Austin, TX (US); Adolfo S. Montero, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 267 days.

(21) Appl. No.: 16/531,004

(22) Filed: Aug. 2, 2019

(65) Prior Publication Data

US 2021/0037010 A1   Feb. 4, 2021

(51) Int. Cl.
*G06F 15/16* (2006.01)
*H04L 29/06* (2006.01)
*H04L 41/082* (2022.01)
*H04W 4/021* (2018.01)

(52) U.S. Cl.
CPC ........ *H04L 63/0876* (2013.01); *H04L 41/082* (2013.01); *H04W 4/021* (2013.01)

(58) Field of Classification Search
CPC ............. H04L 2463/082; H04L 41/082; H04L 63/0876; H04L 63/107; H04W 12/06; H04W 4/021
USPC ...................................................... 709/200
See application file for complete search history.

(56) References Cited

U.S. PATENT DOCUMENTS

| | | | |
|---|---|---|---|
| 6,894,994 B1* | 5/2005 | Grob | H04B 1/7103 370/335 |
| 8,838,376 B2* | 9/2014 | Garin | H04W 4/33 701/409 |
| 8,847,754 B2 | 9/2014 | Buchheim | |
| 8,874,129 B2 | 10/2014 | Foruntanpour | |
| 8,972,589 B2* | 3/2015 | Roese | H04W 4/20 709/229 |
| 9,168,656 B1 | 10/2015 | Wang | |
| 9,204,257 B1 | 12/2015 | Mendelson | |
| 9,674,658 B2 | 6/2017 | Partheesh | |
| 9,677,890 B2 | 6/2017 | Yang | |
| 9,802,322 B2 | 10/2017 | Angle | |
| 10,140,769 B2 | 11/2018 | Kim | |
| 1,025,771 A1 | 4/2019 | Egner | |
| 10,278,154 B2 | 4/2019 | Ronen | |
| 10,637,853 B2* | 4/2020 | Lindemann | H04L 63/0435 |

(Continued)

*Primary Examiner* — Moustafa M Meky
*Assistant Examiner* — Thorne E Waugh
(74) *Attorney, Agent, or Firm* — Prol Intellectual Property Law, PLLC; H. Kenneth Prol

(57) ABSTRACT

A location multi-factor verification method may comprise initiating a boot process of a client device via firmware of the client device, receiving, via a network interface device, an access point (AP) beacon frame identifying a nearby AP, transmitting the AP beacon frame to a location determination service via the network interface device, receiving a geographic location estimation from the location determination service, based on the AP beacon frame, transmitting the geographic location estimation to the nearby AP, and granting a user of the client device access to an operating system of the client device if a boot process authorization instruction is received at the client device via the network interface device.

20 Claims, 4 Drawing Sheets

(56) References Cited

U.S. PATENT DOCUMENTS

| | | | |
|---|---|---|---|
| 10,743,176 B1* | 8/2020 | Khan | H04W 12/069 |
| 10,769,635 B2* | 9/2020 | Lindemann | G06K 9/00604 |
| 2004/0068653 A1* | 4/2004 | Fascenda | H04L 63/0853 |
| | | | 713/168 |
| 2011/0142234 A1* | 6/2011 | Rogers | G06Q 20/40 |
| | | | 380/247 |
| 2011/0305337 A1 | 12/2011 | Devol | |
| 2014/0189808 A1* | 7/2014 | Mahaffey | H04W 12/069 |
| | | | 726/4 |
| 2014/0282877 A1* | 9/2014 | Mahaffey | H04W 12/08 |
| | | | 726/3 |
| 2015/0031390 A1 | 1/2015 | Robertson | |
| 2015/0289094 A1 | 10/2015 | Jang | |
| 2015/0381610 A1* | 12/2015 | Poornachandran | |
| | | | H04W 12/068 |
| | | | 713/155 |
| 2016/0086175 A1* | 3/2016 | Finlow-Bates | H04W 12/068 |
| | | | 705/77 |
| 2016/0125180 A1* | 5/2016 | Smith | H04L 9/3271 |
| | | | 726/7 |
| 2016/0282862 A1 | 9/2016 | Duffley | |
| 2016/0294829 A1* | 10/2016 | Angus | H04L 9/085 |
| 2016/0337863 A1* | 11/2016 | Robinson | H04W 4/021 |
| 2018/0152297 A1* | 5/2018 | Fielding | H04L 9/30 |
| 2018/0152848 A1 | 5/2018 | Egner | |
| 2018/0160441 A1 | 6/2018 | Egner | |
| 2018/0309570 A1* | 10/2018 | Amini | H04L 27/34 |
| 2018/0367314 A1 | 12/2018 | Egner | |
| 2019/0188368 A1* | 6/2019 | Hastings | H04L 63/0492 |
| 2019/0253324 A1* | 8/2019 | Kapinos | H04L 63/0861 |
| 2019/0334884 A1* | 10/2019 | Ross | G06F 21/41 |
| 2020/0106877 A1* | 4/2020 | Ledvina | H04L 51/38 |
| 2020/0128595 A1* | 4/2020 | Dees | H04W 4/023 |

\* cited by examiner

METHOD AND APPARATUS FOR MULTI-FACTOR VERIFICATION OF A COMPUTING DEVICE LOCATION WITHIN A PRESET GEOGRAPHIC AREA

FIELD OF THE DISCLOSURE

The present disclosure generally relates to security of data accessed by mobile information handling systems, and more specifically to inhibiting unauthorized access to remote computing capabilities via geofencing security measures.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include security capabilities for identifying and inhibiting access by unauthorized users.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
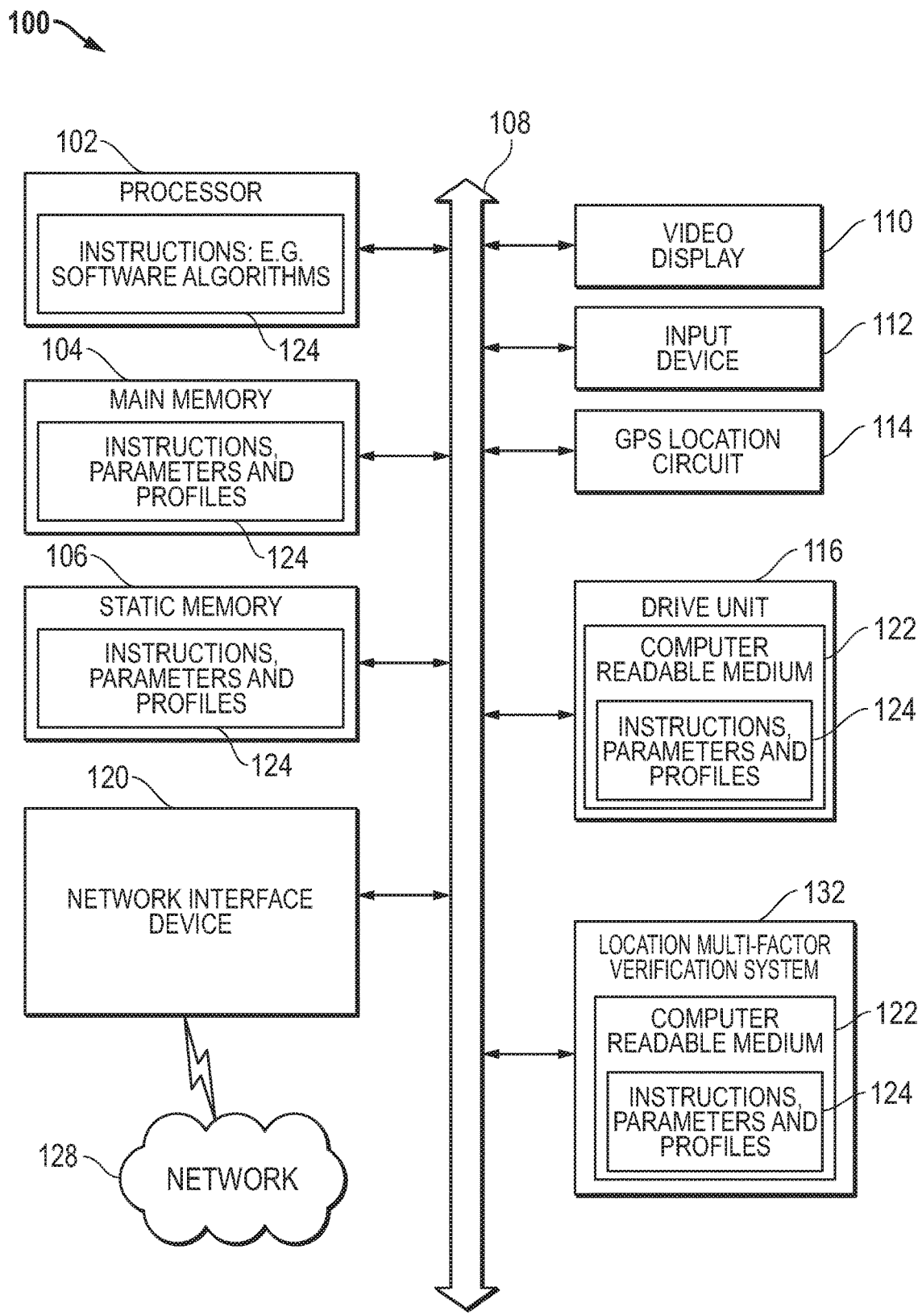
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on stationary information handling systems are now being completed on mobile devices. However, there is a competing need to keep mobile devices secure. A secure network may include one or more wireless access points (APs) in communication with one or more mobile devices. Such a network may be secured by a plurality of methods or security layers. For example, a first security layer may include the Wi-Fi Protected Setup (WPS) security layer, in which the network APs only grant network access to mobile devices providing a protected password or other identification. A second layer may include geofencing methods, in which mobile devices may access secure networks or secure systems on the mobile device itself only upon verification of the mobile device's location within a preset, secure area. Such verification of geographic location may be achieved through various means in existing systems, including through Global Positioning Satellite (GPS) data. GPS data works best in outdoor environments with exceptional line-of-sight, and is ill-suited for use indoors.

Geofencing in such an indoor environment, such as on a corporate campus, may be achieved through triangulation of device based on the known locations of access points, gateways, or routers with which the mobile device is in communication. However, such triangulation geofencing techniques may be circumvented by a mobile device generating a false or "spoofed" list of access points, gateways, or routers with which it claims to be in communication. Using such an approach, a mobile device located outside the preset authorized geographic area may trick the geofencing security system into allowing it access to the secure network or secure systems operating on the mobile device itself. A solution is needed to disallow such a circumvention.

Embodiments of the present disclosure provide a solution to this problem by requiring a location multi-factor verification system to verify the location of the mobile device using multiple separate methods. Such a solution may, in some embodiments, act as a third layer of security. In embodiments of the present disclosure, a mobile device operating code instructions of a location multi-factor verification system may record the Media Access Control (MAC) address and secure set identifier (SSID) of one or more network access points with which the mobile device is in communication. These network access points may control all access to the network, databases or storage systems set to operate only within the network, or other network resources, including portions of the operating system onboard the mobile devices in some embodiments. Thus, only APs under the control of network Information Technology (IT) specialists and running portions of the location multi-factor verification system may grant mobile devices access to these network resources. The security measures of the location multi-factor verification system may be performed during the boot up process, prior to initiation of the operating system on the mobile device. These MAC addresses and SSIDs may be used to determine a rough geographical location. A mobile device providing a rough geographical location within the preset geographical area to a secure access point operating the location multi-factor verification system may be granted access to a secure network via the access point. The location multi-factor verification system in embodiments described herein may then initiate a third layer of authentication, in order to combat false or "spoofed" rough geographical location data, also prior to completion of the mobile device boot up process.

The access point operating the location multi-factor verification system may begin an asymmetric cryptographic protocol by transmitting a challenge message to the mobile device. The challenge message in embodiments may be generated using a private key provisioned directly from an IT specialist charged with maintaining the secure network or the mobile device. The mobile device may reply with a response message generated using a public key also provisioned by the corporate IT specialist(s). If the response message received by the access point matches a challenge response comparator generated at the access point using the private key and the public key, the access point may verify the mobile device is both located within the preset geographical area, and is authorized to access the network or secure systems on the mobile device itself. The access point in embodiments may then transmit an instruction to complete the boot up process on the mobile device, giving the user access to the operating system thereon. In such a way, embodiments of the present disclosure may grant access to the secure network to a mobile device, or may only allow a user to access the operating system of the mobile device upon multi-factor verification of the location of the mobile device within the preset secure geographical area.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. Specifically, the information handling system 100 may operate as an access point, router, or gateway to a network, or as a client device attempting to access that network. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the location multi-factor verification system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include a GPS location circuit 114 providing location measurements, and a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used.

The information handling system 100 can include a set of instructions 124 that can be executed to cause the computer system to perform any one or more of the methods or computer based functions disclosed herein. For example, instructions 124 may execute a location multi-factor verification system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116, and the location multi-factor verification system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a machine learning model and a parameter grid. The disk drive unit 116 and static memory 106 also contain space for data storage. Further, the instructions 124 may embody one or more of the methods or logic as described herein. For example, instructions relating to the location multi-factor verification system 132 may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the location multi-factor verification system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The location multi-factor verification system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a location multi-factor verification system 132 that may be operably connected to the bus 108. The location multi-factor verification system 132 computer readable medium 122 may also contain space for data storage. The location multi-factor verification system 132 may perform tasks related to restricting user access to the operating system of the information handling system 100 and to the secure network 128 to authorized information handling systems verified through multiple different methods to be located within a preset authorized geographical area. In an embodiment, the location multi-factor verification system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Further, in an exemplary, non-limited embodiment, implementations can include distributed processing, component/object distributed processing, and parallel processing. Alternatively, virtual computer system processing can be constructed to implement one or more of the methods or functionality as described herein. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
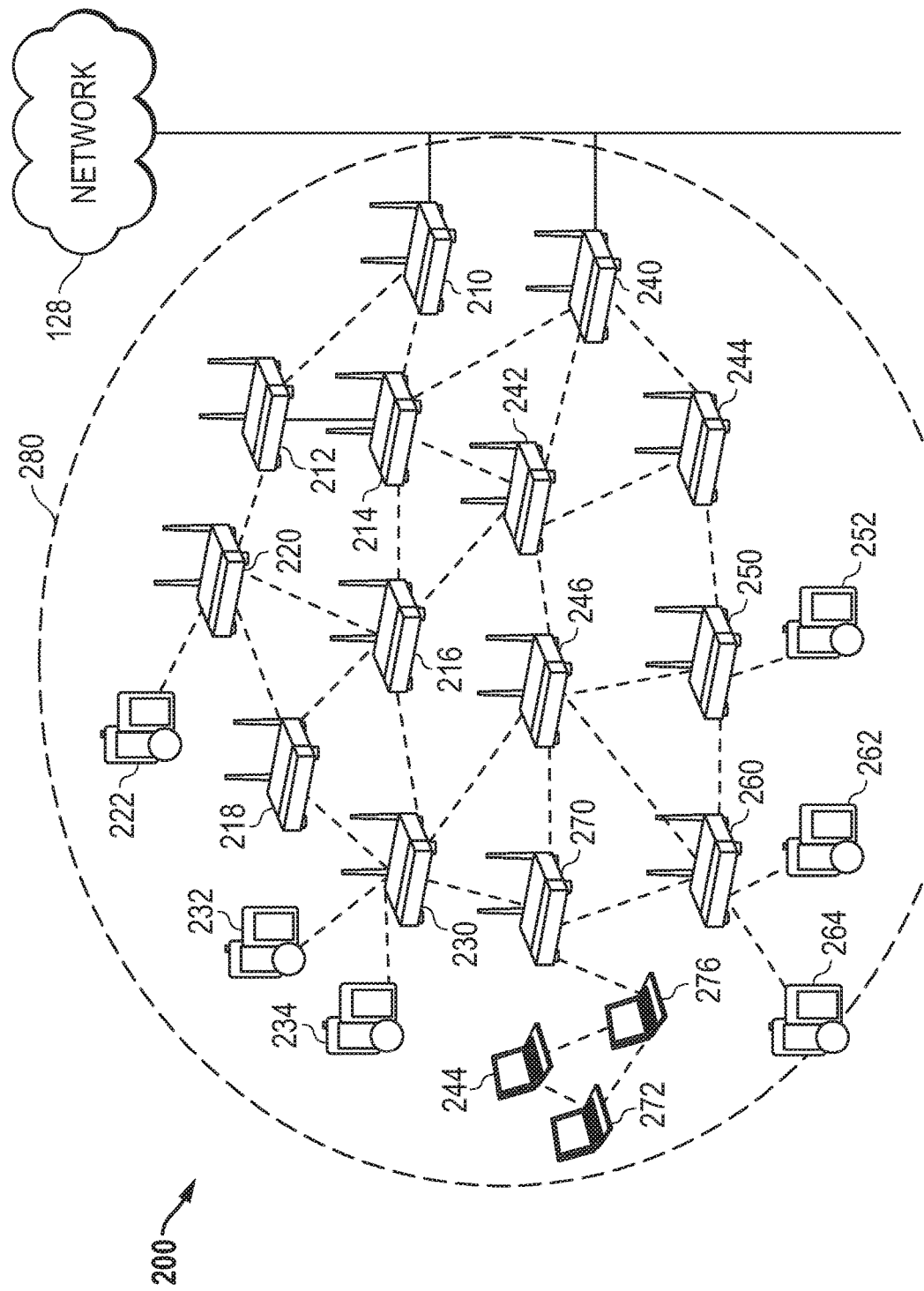
FIG. 2 is a block diagram illustrating a network of access points operating the location multi-factor verification system according to an embodiment of the present disclosure.

FIG. 2 is a block diagram illustrating a network of access points, routers, or gateways operating the location multi-factor verification system to allow access to the network to authenticated operating systems within the preset geographical area according to an embodiment of the present disclosure. Local network 200 illustrates a wireless neighborhood that can include one or more information handling systems. The local network 200 in an embodiment may be a building, campus, shopping area, airport, or other area having a plurality of competing wireless link options available. In some aspects, the local network 200 may be facilities or a campus associated with an enterprise, military, university, government or municipal organization.

The local network 200 in an embodiment may take many different known forms. For example, the local network 200 may be a wide area network (WAN), a local area network (LAN), a wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across a wireless local area network may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. The local network 200 in an embodiment may be located entirely within the boundaries of a known geographical area 280. For example, the local network 200 may be located within the boundaries of a geographical area 280 on a corporate campus.

Within local network 200 there are one or more gateway devices 210 and 240 providing connectivity between the secure network 128 and several wired or wireless routers. For example, gateway 210 may provide connectivity between the secure network 128 and routers 212, 214, 216, and 218. As another example, gateway 240 may provide connectivity between the secure network 128 and routers 242, 244, and 246. The secure network 128 may also be accessible by other gateways, routers, or access points (not shown) as described with respect to FIG. 3. In some embodiments, the gateways 210 and 240 may comprise edge routers, delivering packets between a plurality of sub-networks. In other embodiments, the gateways 210 and 240 may connect wirelessly to secure network 128. For example, gateway 240 may be capable of routing packets to a first sub-network including router 214 and a second sub-network including router 242. The gateways 210 and 240 may connect to secure network 128 by wireline or Ethernet connections in some embodiments. In embodiments in which the gateways connect wirelessly to secure network 128, the gateways 210 and 240 may be capable of communicating directly with one or more access points.

Each of the routers in an embodiment may also connect through a wired or wireless connection with one or more other routers or with access points of the local network 200. For example, router 214 may connect to router 216, which may also connect to router 218. As another example, router 242 may connect to router 244, and router 246. One or more routers in local network 200 may provide connectivity between the secure network 128 and one or more access points. For example, router 212 may provide connectivity between the secure network 128 and an access point 220, via gateway 210. As another example, router 230 may provide connectivity between an access point 230 and the secure network 128, also via gateway 210. As yet another example, router 246 may provide connectivity between access points 250, 260, and 270 and the network 128, via gateway 240.

Each of routers 212, 214, 216, 218, 242, 244, and 246 in an embodiment may comprise a wired or wireless router. In some embodiments, routers 2212, 214, 216, 218, 242, 244, and 246 may operate as core routers to distribute packets within a single sub-network. For example, router 212 may operate as a core router to distribute packets within a first sub-network including access point 220. In other embodiments, routers 212, 214, 216, 218, 242, 244, and 246 may operate as edge routers to distribute packets between a plurality of networks. For example, router 214 may route packets to access point 220 via router 212 within the first sub-network, or may route packets to router 242 within the second sub-network. In still other embodiments, routers 212, 214, 216, 218, 242, 244, and 246 may operate as virtual routers, or as nodes in a mesh network structure. In some embodiments, various routers 212, 214, 216, 218, 242, 244, and 246 may operate as any one of these router types (e.g., core, edge, virtual, mesh node), in combination with other router types.

Access points 220, 230, 250, 260, and 270 in an embodiment may be licensed or unlicensed, and may operate in any number of radio frequency bands. For example, both WLAN and WWAN may use the Unlicensed National Information Infrastructure (U-NII) band which typically operates in the ~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Each of the access points 220, 230, 250, 260, and 270 in an embodiment may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards such as Bluetooth may be used. APs 220, 230, 250, 260, and 270 in some embodiments may establish any combination of macro-cellular wireless connections including 2G, 2.5G, 3G, 4G, 5G or the like from one or more service providers such as Sprint, Verizon, AT&T, and T-Mobile. Service provider macro-cellular base stations may operate pursuant to 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like. Licensed carriers may include small cell base stations that operate in licensed communication frequency bands and may operate as an anchor wireless link in tandem with operation of unlicensed small cell WWAN wireless links of unlicensed small cell WWAN base stations as understood. For example, LTE-LAA or emerging 5G systems may operate with such an example embodiment architecture.

As another example, access points 220, 230, 250, 260, and 270 may comprise unlicensed small cell WWAN base stations in an embodiment. An unlicensed small cell WWAN base station of such an embodiment may operate as a femtocell base station. In another example of such an embodiment, an unlicensed small cell WWAN base station may operate as an eNodeB base station. Example communication frequency bands may also include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 900 MHz or similar bands as understood by those of skill in the art. Within local portion of wireless local network 200, the wireless access points 220, 230, 250, 260, and 270 may operate under Wi-Fi or WiGig as well as small cell WWAN in emerging 5G technology in various embodiments.

Each access point in an embodiment may be capable of establishing a wireless connection with one or more client information handling systems attempting to access local network 200 and secure network 128. For example, AP 220 in an embodiment may establish a connection with client information handling system 222. As another example, AP 230 in an embodiment may establish a connection with information handling systems 234 and 232. As yet another example, AP 250 in an embodiment may establish a connection with client information handling system 252. As yet another example, AP 260 in an embodiment may establish a connection with client information handling systems 262 and 264.

In an embodiment, one or more of routers 212, 214, 216, 218, 242, 244, and 246 or one or more of APs 220, 230, 250, 260, and 270 may operate a portion of the location multi-factor verification system. For example, in an embodiment, APs 220, 230, 250, 260, and 270 may control all access to the network 128, databases or storage systems set to operate only within the network 128, or other network resources, including portions of the operating system onboard information handling systems connecting to the network 128 via one or more of APs 220, 230, 250, 260, and 270. Thus, only APs 220, 230, 250, 260, and 270 under the control of network Information Technology (IT) specialists and running portions of the location multi-factor verification system may grant mobile devices access to these network resources. An IT specialist responsible for maintaining the local network 200 may use an information handling system in an embodiment to directly access and provision one of the routers with a private key and a public key for use by each of the routers and access points in asymmetric cryptography. For example, an IT specialist may use mobile information handling system 276 to directly access AP 270, and provision AP 270 with both a public key and a private key. AP 270 in such an embodiment may then transmit both keys to each of the remaining APs 220, 230, 250, and 260 throughout the local network 200, via one or more of the routers 212, 214, 216, 218, 242, 244, and 246 connecting the APs 220, 230, 250, 260, and 270 to one another and to the network 128.

In an embodiment, one or more mobile client information handling systems may operate another portion of the location multi-factor verification system. The IT specialist may also provision a plurality of mobile client information handling systems in an embodiment with the public key alone, which the mobile client information handling systems may use in a later attempt to establish direct communication with one of the access points 220, 230, 250, 260, or 270 of the local network 200. For example, the IT specialist may use mobile information handling system 276 to provision mobile information handling systems 272 and 274 with the public key also provisioned to the access points 220, 230, 250, 260, and 270 in an embodiment. However, the private key may be provisioned and stored only within the access points 220, 230, 250, 260, and 270, and may not be accessible by any of the mobile information handling systems 272 or 274 or other client information handling systems (e.g., 222, 232, 234, 252, 262, or 264). Mobile information handling systems 272 and 274 may operate the portion of the location multi-factor verification system in an embodiment via preboot authentication code instructions within the firmware, or within the Basic Input Output (BIOS) of the mobile information handling system. The code instructions of the location multi-factor verification system in an embodiment may be executed entirely prior to handing off of processor functionality from the BIOS to the operating system of the mobile information handling system. Although mobile information handling systems 272 and 274 may operate a portion of the location multi-factor verification system in an embodiment, this portion functions only to interface with one or more of the APs 220, 230, 250, 260, or 270 within the local network 200. The portion of the location multi-factor verification system operating on the one or more APs 220, 230, 250, 260, or 270 in an embodiment may provide the third layer of security used to circumvent geofencing spoofing described herein (e.g., in addition to a WPS first security layer, and a geofencing second security layer).

Figure 3:
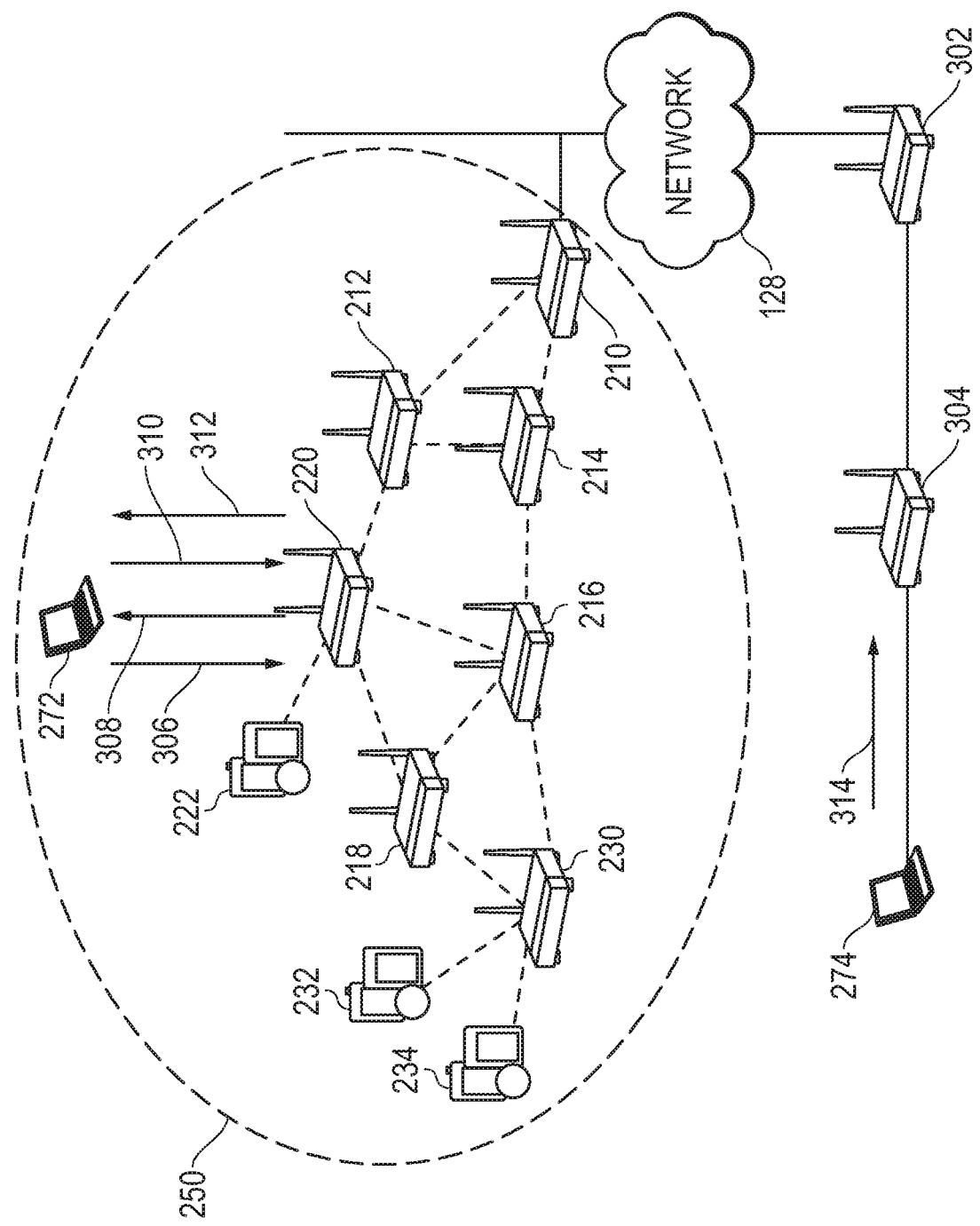
FIG. 3 is a block diagram illustrating an information handling system establishing an authorized geographical location and providing valid credentials according to an embodiment of the present disclosure.

FIG. 3 is a block diagram illustrating an information handling system establishing an authorized geographical location for geofencing and providing valid credentials for asymmetrical cryptography according to an embodiment of the present disclosure. After the IT specialist in an embodiment has provisioned the access points 220, or 230 with public and private keys (e.g., via one or more routers 212, 214, 216, and 218), and provisioned one or more mobile information handling systems 272, or 274 with the public key alone, one or more of the mobile information handling systems 272 or 274 may attempt to access the secure network 128, and the local network 200 via one of the access points. For example, mobile client information handling system 272, operating as an employee laptop in an embodiment may establish a connection with AP 220, which may be located in the preset geographical area 280 (e.g., within the confines of the corporate campus).

One or more of the mobile information handling systems may also attempt to access the secure network 128 or the local network within the preset geographical area 280 from outside the preset geographical area 280, in violation of security protocols. For example, an employee that has been issued mobile information handling system 274 may take the mobile information handling system 274 home, and attempt to access the secure network 128 via the employee's home access point 304 or home gateway 302, located outside the preset geographical area 280. This attempt may be in violation of the security protocols allowing employees to only access the secure network 128 or the operating system of the mobile information handling system 274 issued to them from within the confines of the corporate campus or preset geographical area 280. The location multi-factor verification system operating in part on the APs 220, or 230 of the local network and also in part on the mobile information handling systems 272 or 274 may operate to grant users access to the secure network 128 and the operating system of the mobile information handling systems 272 or 274 only upon successful multi-factor validation of the location of the mobile information handling systems 272 and 274 within the preset geographical area 280. As described herein, the portion of the location multi-factor verification system operating on APs 220 and 230 may provide the third layer of security used to circumvent geofencing spoofing in an embodiment, and the portion of the location multi-factor verification system operating on mobile information handling systems 272 or 274 may operate to provide necessary information to the APs 220 or 230 to enable the APs 220 or 230 to successfully police access to the network 128. Further, the APs 220 or 230 may operate only within the local network, administered, monitored, and maintained by IT specialists of the network 128 owners.

An information handling system operating within the preset geographical area in an embodiment may transmit a rough geographic position of the information handling system to one of the APs within the local network. For example, mobile information handling system 272 may be located within the preset authorized geographical area 280 (e.g., corporate campus), and may transmit a rough geographical location (e.g., within the corporate campus 280) to the AP 220 located within the local network. The mobile information handling system 272 in an embodiment may receive this rough geographical location from a location detection service in an embodiment. In such an example geofencing method, the mobile information handling system 272 may receive an AP beacon frame indicating it has established a connection with the AP 220. The AP beacon in such an embodiment may further identify the time of communication, and a MAC address or SSID for the AP 220. The mobile information handling system 272 may transmit that AP beacon frame to a location detection service, such as, for example, the Google® #geolocation API. The location detection service may store a plurality of associations between known geographical locations and known MAC addresses or SSIDs of a plurality of APs, gateways, or routers. The location detection service may use the received AP beacon frame to identify a rough or approximate geographic area in which the mobile information handling system 272 is located based on its established communication with the AP 220. Thus, the location detection service may transmit a message to the mobile client information handling system 272 indicating it is located within the preset geographical area 280. The mobile information handling system 272 may then forward this rough geographical location 306 to the AP 220.

The AP 220 executing code instructions of the location multi-factor verification system in an embodiment may respond to the received indication 306 that the mobile information handling system 272 is located within the preset geographical area 280 by transmitting an asymmetric encryption challenge message 308 to the mobile information handling system 272. The AP 220 may generate the asymmetric encryption challenge message 308 using the private key provisioned to it by the IT specialist. The AP 220 may also generate an asymmetric encryption challenge comparator using the challenge message 308 and the public key provisioned to it by the IT specialist.

In an embodiment in which the mobile client information handling system 272 is operating the location multi-factor verification system, upon receipt of the challenge message 308, the mobile information handling system 272 may then generate a challenge response message 310. The mobile client information handling system 272 may generate such a challenge response message 310 using the public key provisioned to it by the IT specialist, based on the received challenge message 308. The mobile information handling system 272 may transmit the challenge response message 310 back to the AP 220 for comparison with the challenge comparator. If the challenge response message 310 matches the challenge comparator generated at the AP 220, the AP 220 in an embodiment may respond by transmitting an instruction 312 to the portion of the location multi-factor verification system operating on the mobile information handling system 272 to complete the boot process, and grant the user access to the operating system of the mobile information handling system 272.

In another embodiment, in which the mobile client information handling system 272 is not operating the location multi-factor verification system, the mobile information handling system 272 may be incapable of generating a challenge response message 310. In such a scenario, the AP 220 may await receipt of the challenge response message 310 until a preset timer elapses. Once such a timer elapses, the location multi-factor verification system operating at the AP 220 in such an embodiment may terminate access by the mobile information handling system 272 to the local network or the secure network 128.

In yet another embodiment, in which the mobile client information handling system 272 has not been provisioned with the correct public key, the mobile information handling system 272 may be incapable of generating a challenge response message 310 that matches the challenge comparator generated at the AP 220. In such a scenario, the AP 220 may determine the challenge response message 310 does not match the challenge comparator, and the location multi-factor verification system operating at the AP 220 in such an embodiment may terminate access by the mobile information handling system 272 to the local network or the secure network 128. In addition, the location multi-factor verification system operating at the AP 220 in such an embodiment may transmit an instruction to the mobile information handling system 272 to abort the boot up process. The location multi-factor verification system operating at the mobile information handling system 272 in such an embodiment may receive such an instruction, and terminate the boot up process such that the user cannot access the operating system at mobile information handling system 272.

As described herein, it is possible for a mobile client device to provide false geographic locations, making it appear as if it is located within the preset geographical area when it is in fact, outside that perimeter. For example, mobile client information handling system 274 in an embodiment may actually be located outside the preset geographical area 280. However, it is possible for mobile information handling system 274 to provide a false AP beacon frame, making it appear as if it is located inside area 280. As an example, mobile information handling system 274 may provide an AP beacon frame indicating it is in communication with AP 220, or AP 230, when in fact, it is not.

One method of generating such a false AP beacon frame includes accessing beacon frames previously stored on the mobile client information handling system 274 when it was in communication with AP 220 or AP 230 (e.g., when the mobile client information handling system 274 was previously located within the area 280 and in communication with the local network described with respect to FIG. 2). For example, following the IT specialist provisioning the mobile client information handling system 274 with the public key, the mobile client information handling system 274 may use the public key while still located within the geographic area 280 (e.g., on corporate campus) to legitimately gain access to AP 220 or AP 230. During this process of gaining access from within the geographic area 280, the mobile client information handling system 274 may store an AP beacon frame logging communication with AP 220 or AP 230 at the time the mobile client information handling system 274 is located within the geographical area 280.

The employee responsible for the mobile client information handling system 274 may later take the mobile client information handling system 274 home, or elsewhere outside the authorized geographic area 280. A false AP beacon frame may then be generated by accessing the previously stored AP beacon frame identifying the AP 220 or AP 230 by MAC address or SSID, and altering the time stamp to indicate the mobile client information handling system 274 is currently accessing AP 220 or AP 230. In another example, a false AP beacon frame may be generated by accessing previously stored AP beacon frames identifying AP 220 or AP 230 from other client information handling systems 222, 232, 234, or 272. The mobile client information handling system 274 may submit such a false AP beacon frame to a location detection service, and receive a rough geographic location indicating (based on the false AP beacon frame) that the client information handling system 274 is currently located within the preset geographical area 280, despite its actual location outside of this area. The mobile client information handling system 274 may then submit the rough geographic location 314 to the router 304 and gateway 302, both located outside of the local network within geographic area 280, to attempt to gain access to the secure network 128 and to complete the boot up process for the mobile client information handling system 274.

In some embodiments, the mobile information handling system may transmit a request to access the secure network 128 along with the rough geographic location 314. The secure network 128 in such an embodiment may include a server, gateway, router, or AP running a portion of the location multi-factor verification system in an embodiment. In such an embodiment, the AP 304, which may not operate the location multi-factor verification system may transmit the request to access the secure network 128 to the network 128 via gateway 302, which may not operate the location multi-factor verification system. The server, gateway, router, or AP within secure network 128 running the portion of the location multi-factor verification system in such an embodiment may then receive the request to access the network 128, and the rough geographic location 314. The server, gateway, router, or AP within network 128 running the portion of the location multi-factor verification system in such an embodiment may then determine whether the rough geographic location 314 is within the preset geographic location 280. The secure network 128 may grant access via gateway 302 and router 304 to the mobile client information handling system 274 in such an embodiment, even if the rough geographic location 314 is falsified to indicate the mobile client information handling system 274 is located within the preset area 280. However, if the rough geographic location 314 indicates the mobile client information handling system 244 is located outside the preset area 280, the location multi-factor verification system operating at a server, gateway, or AP within the secure network 128 may transmit an instruction via gateway 302 and AP 304 to the mobile information handling system 274 to abort the boot up process. Further, the location multi-factor verification system operating at a server, gateway, or AP within the secure network 128 in such an embodiment may terminate communication between the mobile information handling system 274 and the secure network 128.

Before the boot up process for the mobile client information handling system 274 can be completed, the second phase of the location multi-factor verification method must be successfully completed in an embodiment. In existing geofencing systems, providing such a rough geographical location may be sufficient to establish the location of the mobile client information handling system 274, regardless of whether this location is determined based on falsified or accurate AP beacon frames. In such previous systems, the mobile client information handling system 274 may be granted access to the secure network 128, even if the mobile client information handling system 274 is actually located outside the preset authorized geographical area 280. The location multi-factor verification system overcomes this limitation of previous systems by requiring completion of the second phase of the multi-factor verification method, incorporating asymmetric cryptography, in order to complete the boot up process.

As described above, when a client information handling system (e.g., 272) provides the AP 220 with a rough geographic location within the authorized geographic area 280 generated based on non-falsified AP beacon frames indicating current communication with the AP 220, the AP 220 may respond with an asymmetric cryptography challenge message. In other words, if the client information handling system is actually in communication with an authorized AP running a portion of the location multi-factor verification system, the result is initiation of the second phase (asymmetric encryption method) of the location multi-factor verification system by the authorized AP. However, only authorized APs (e.g., 220 or 230) operating within the local network administered, controlled, and maintained by the owner of the network 128 in an embodiment may be capable of performing this second phase of the location multi-factor verification system. If the mobile client information handling system transmits a false AP beacon frame to an AP, router, or gateway that is outside the local network and not running the location multi-factor verification system, the AP, router, or gateway the mobile client information handling system is using to access the secure network will not transmit the asymmetric encryption challenge message, as required by the location multi-factor verification system running onboard the mobile client information handling system. For example, when the mobile client information handling system 274 transmits the false AP beacon frame 314 to AP 304, which is not running the location multi-factor verification system, AP 304 will not transmit the asymmetric encryption challenge message, as required by the location multi-factor verification system running onboard the mobile client information handling system 274. The boot up process of the mobile client information handling system 274 in such an embodiment may stall, time out, and terminate. In such a way, the location multi-factor verification system in an embodiment may prohibit boot up of a mobile client information handling system attempting to access a secure network or its own operating system, unless the location of that mobile information handling system within the preset authorized geographical area is authorized both by geofencing technology, and through asymmetric cryptography.

Figure 4:
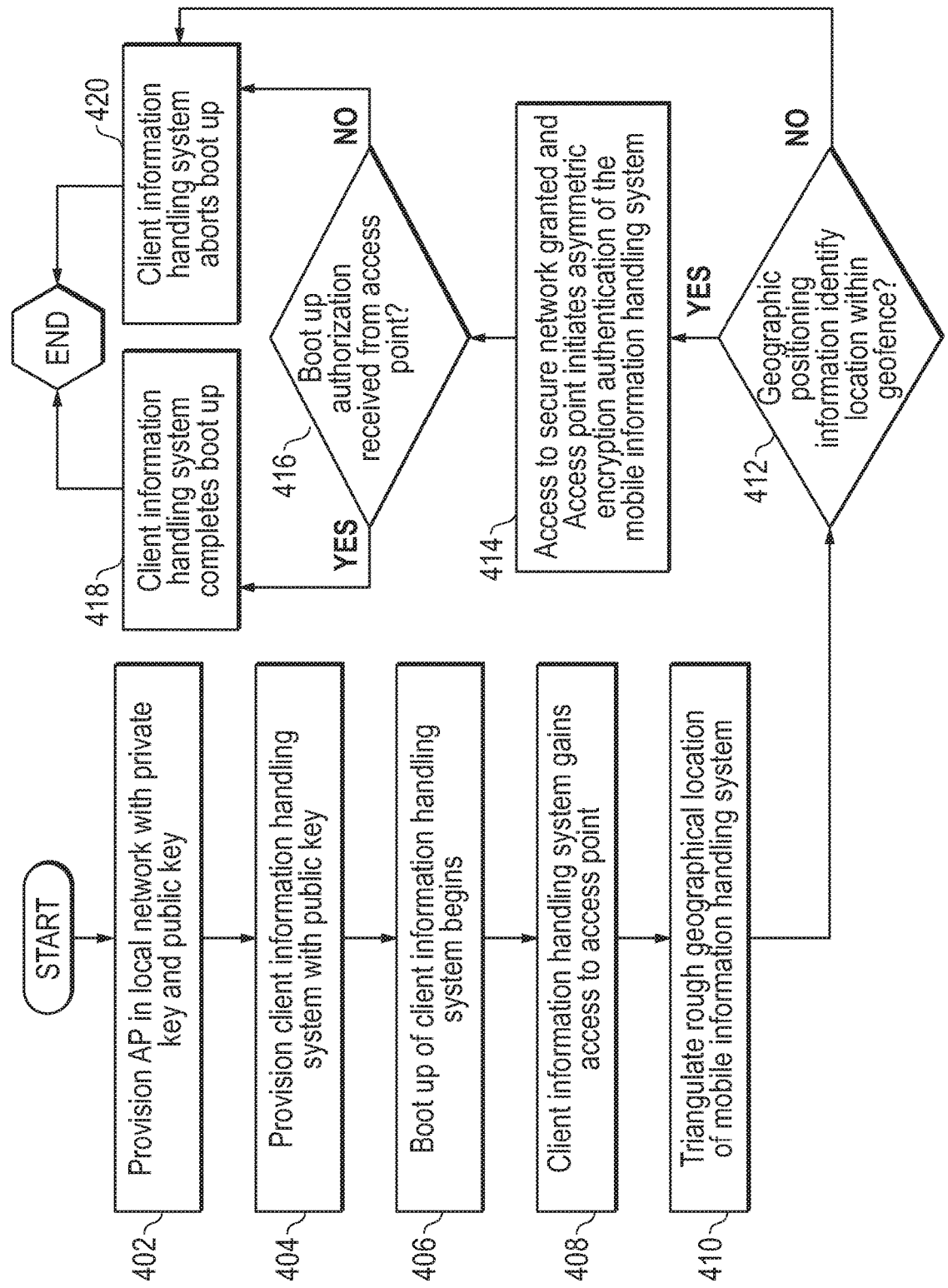
FIG. 4 is a flow diagram illustrating a method of controlling boot up capabilities for an information handling system based on asymmetrical cryptography and geofencing according to an embodiment of the present disclosure.

FIG. 4 is a flow diagram illustrating a method of controlling boot up capabilities for an information handling system based on asymmetrical cryptography and geofencing to limit access to the information handling system's operating system to users in specific geographic regions according to an embodiment of the present disclosure. As described herein, embodiments of the present disclosure prevent circumvention of geofencing methods by requiring a location multi-factor verification system to verify the location of the mobile device using multiple separate methods. The first of these methods may include a geofencing factor, and asymmetric cryptography factor, in order to combat false or "spoofed" rough geographical location data. In such a way, embodiments of the present disclosure may grant access to a secure network to a mobile device, or may only allow a user to access the operating system of the mobile device upon multi-factor verification of the location of the mobile device within the preset secure geographical area.

At block 402, one or more access points within a local network may be provisioned with a private key and a public key in an embodiment. For example, in an embodiment described with reference to FIG. 2, an IT specialist responsible for maintaining the local network 200 may use mobile information handling system 276 to directly communicate with access point 270, and provision AP 270 with both a public key and a private key. AP 270 in such an embodiment may then transmit both keys to each of the remaining APs 220, 230 250, and 260 throughout the local network 200.

A mobile client information handling system in an embodiment may be provisioned with a public key at block 404. For example, in an embodiment described with reference to FIG. 2, the IT specialist may use mobile information handling system 276 to provision mobile information handling systems 272 and 274 with the public key also provisioned to the APs 220, 230, 250, 260, and 270 in an embodiment. However, the private key may be provisioned and stored only within the APs 220, 230, 250, 260, and 270, and may not be accessible by any of the mobile information handling systems 272 or 274, or other client information handling systems (e.g., 22, 232, 234, 252, 262, or 264).

At block 406, the mobile client information handling system may begin a boot up process in an embodiment. The mobile client information handling system in an embodiment may operate a portion of the location multi-factor verification system during the boot up process, prior to the user gaining access to the operating system of the mobile information handling system. For example, in an embodiment described with reference to FIG. 2, the mobile information handling systems 272 and 274 may operate the portion of the location multi-factor verification system in an embodiment via preboot authentication code instructions within the firmware, or within the Basic Input Output (BIOS) of the mobile information handling system. The code instructions of the location multi-factor verification system in an embodiment may be executed entirely prior to handing off of processor functionality from the BIOS to the operating system of the mobile information handling system. The boot up process may be initiated and handed off to the location multi-factor verification system within the firmware at block 406.

The boot up process in an embodiment may be initiated within the preset geographical area authorized for accessing the operating system of the mobile information handling system, or it may occur outside this preset authorized area. For example, in an embodiment described with reference to FIG. 3, the mobile client information handling system 272 may initiate a boot up sequence while it is located within the preset geographical area 280. As another example, the mobile client information handling system 274 may initiate a boot up sequence while it is located outside the preset geographical area 280.

The mobile client information handling system in an embodiment may gain access to an access point at block 408. For example, the mobile client information handling system in an embodiment may exchange a series of Extensible Authentication Protocol (EAP) messages with the Access Point (AP) as part of a Wi-Fi Protected Setup (WPS) security method. This WPS security method may comprise a first security layer protecting access to the local network in which the AP resides. The AP in an embodiment may only grant access to mobile information handling systems that provide proper authorization. For example, the mobile information handling system may transmit a password to the AP, taken from a sticker mounted on the external physical case of the AP. In another example, a user of the mobile information handling system may place the mobile information handling system and the AP in simultaneous discovery modes to identify one another by pressing a physical button on both the AP and the mobile information handling system contemporaneously. In yet another example, the mobile information handling system may establish a near-field communication link with the AP to identify itself as being located nearby the AP.

The rough geographic location of the mobile client information handling system may be triangulated in an embodiment at block 410. Upon initiation of the location multi-factor verification system within the firmware of the mobile client information handling system in an embodiment, the location multi-factor verification system may receive and record access point (AP) beacon frames broadcast by access points within range of the mobile information handling system. For example, in an embodiment described with reference to FIG. 3, mobile client information handling system 272 may receive and store in a memory an AP beacon frame providing a time of receipt, and the MAC address, or SSID of AP 220, located within the preset geographical area 280. In another example, mobile client information handling system 274 may receive and store in a memory an AP beacon frame providing a time of receipt, and the MAC address, or SSID of AP 304, not located within the preset geographical area 280.

These AP beacon frames may be used in an embodiment in order to attain a rough geographical location of the mobile information handling system. For example, the mobile client information handling system 272 or 274 may transmit the AP beacon frame received from AP 220 or AP 304, respectively, to a location detection service, such as, for example, the Google® geolocation API. The location detection service may store a plurality of associations between known geographical locations and known MAC addresses or SSIDs of a plurality of APs, gateways, or routers. The location detection service may use the received AP beacon frame to identify a rough or approximate geographic area in which the mobile information handling system 272 or 274 is located based on its established communication with the AP 220, or AP 304, respectively. In one example embodiment, the location detection service may transmit a message to the mobile client information handling system 272 indicating it is located within the preset geographical area 280. In another example embodiment, the location detection service may transmit a message to the mobile client information handling system 274 indicating it is located outside the preset geographical area 280.

The location multi-factor verification system operating at the access point in an embodiment may determine whether the rough geographical position provided by the mobile information handling system is within a preset geographical area at block 412. For example, in an embodiment described with reference to FIG. 3, the mobile information handling system 272 may forward the rough geographical location 306 to the AP 220, indicating the mobile information handling system is within the preset geographical area 280.

As another example, the mobile information handling system 274 may forward a rough geographical location 314 to the router 304 indicating the mobile client information handling system 274 is outside the preset geographical area 280. In such an embodiment, the mobile information handling system may transmit a request to access the secure network 128 along with the rough geographic location 314. The server, gateway, router, or AP within secure network 128 running the portion of the location multi-factor verification system in such an embodiment may then receive the request to access the network 128, and the rough geographic location 314, indicating the mobile information handling system is located outside the preset geographical area 280 in an embodiment.

As yet another example, the mobile information handling system 274 may forward a falsified geographical location 314 to the router 304 indicating the mobile client information handling system 274 is located within the preset geographical area 280, along with a request to access the secure network 128. The server, gateway, router, or AP within secure network 128 running the portion of the location multi-factor verification system in such an embodiment may then receive the request to access the network 128, and the falsified rough geographic location 314, indicating the mobile information handling system is located within the preset geographical area 280 in an embodiment. If the request includes a correct identification of the server, gateway, router, or AP within network 128 controlling access to network 128 via router 304, and a correct password in an embodiment, the request may include sufficient information to satisfy the WPS first layer of security, and the geofencing second layer of security used in existing systems. For example, the server, gateway, router, or AP within network 128 running the portion of the location multi-factor verification system in such an embodiment may then determine whether the rough geographic location 314 is within the preset geographic location 280. If the AP operating the location multi-factor verification system within the local network, or the server, gateway, router, or AP operating the location multi-factor verification system within the secure network determines the rough geographical location is within the preset geographical area in an embodiment, the method may proceed to block 414. If the AP operating the location multi-factor verification system within the local network, or the server, gateway, router, or AP operating the location multi-factor verification system within the secure network determines the rough geographical location is outside the preset geographical area in an embodiment, the method may proceed to block 420.

At block 414, in an embodiment in which the rough geographical location provided by the mobile information handling system is within the preset geographical area, the access point may initiate an asymmetric encryption authentication method. This asymmetric encryption authentication method may only be performed by APs within the local network controlled, policed, and maintained by IT specialists of the corporation owning the secure network in an embodiment. For example, the AP 220 executing code instructions of the location multi-factor verification system in an embodiment may respond to the received indication 306 that the mobile information handling system 272 is located within the preset geographical area 280 by transmitting an asymmetric encryption challenge message 308, generated using the private key provisioned at block 402 to the mobile information handling system 272. Upon receipt of the challenge message 308, the mobile information handling system 272 may then generate a challenge response message 310 using the public key provisioned to it at block 404, based on the received challenge message 308. The mobile information handling system 272 may transmit the challenge response message 310 back to the AP 220 for comparison with a challenge comparator generated by AP 220 using the challenge message 308 and the public key provisioned to it at block 402.

In another example, the mobile client information handling system 274 may satisfy the WPS first security protocol, and the geofencing second security protocol to access the secure network 128 via AP 304. However, because AP 304 is not within the local network 200, or controlled, policed, or maintained by the corporate IT specialists, the AP 304 in such an embodiment may not be operating any portion or code instructions of the location multi-factor verification system. As described herein, it is possible to circumvent geofencing security measures by falsifying geographic location information for the mobile client information handling system. As a consequence, the secure network 128 in existing systems may grant access via gateway 302 and router 304 to the mobile client information handling system 274, even if the rough geographic location 314 is falsified to indicate the mobile client information handling system 274 is located within the preset area 280. However, in an embodiment of the present disclosure, because the AP 304 through which the mobile information handling system 274 is accessing the secure network 128 is not operating any portion of the location multi-factor verification system, the AP 304 will not initiate an asymmetric encryption method to verify the location or identity of the mobile information handling system 274, and the mobile information handling system 274 will fail to overcome the third security protocol provided by the location multi-factor verification system.

The location multi-factor verification system operating at the mobile client information handling system in an embodiment may determine whether a boot up authorization instruction has been received from the access point at block 416. For example, in an embodiment in which the challenge response message 310 matches the challenge comparator generated at the AP 220, the AP 220 in an embodiment may respond by transmitting an instruction 312 to the portion of the location multi-factor verification system operating on the mobile information handling system 272 to complete the boot process, and grant the user access to the operating system of the mobile information handling system 272. As another example, in an embodiment in which the rough geographic location supplied to AP 304 is falsified, the AP 304 may not initiate an asymmetric encryption method to verify the location or identity of the mobile information handling system 274. This may be the case because the AP 304, through which the mobile information handling system 274 is accessing the secure network 128, is not operating any portion of the location multi-factor verification system. In such an embodiment, the AP 304 may fail to transmit a boot up authorization instruction to the mobile information handling system 274, as would normally occur following positive identification of the mobile information handling system through the asymmetric cryptography method. If the boot up authorization instruction has been received from the access point in an embodiment, the method may proceed to block 418. If the boot up authorization instruction has not been received from the access point in an embodiment, the method may proceed to block 420.

At block 418, in an embodiment in which the mobile client information handling system has received a boot up authorization instruction, the location multi-factor verification system operating on the mobile information handling system may complete the boot up process. For example, in an embodiment in which the mobile client information handling system 272 has transmitted to the AP 220 a rough geographic location 306 indicating it is located within the preset geographical area 280, and has transmitted to the AP 220 a challenge response 310 that matches the challenge comparator generated at AP 220 using both the private key and public key, AP 220 may transmit an instruction 312 to complete the boot up process. Upon receiving this instruction 312, the location multi-factor verification system operating at the mobile client information handling system 272 in an embodiment may complete the boot up process by handing control over from the firmware or BIOS to the operating system for the mobile client information handling system 272. The user may then be granted access to the operating system of the mobile client information handling system 272, the local network 200, and the secure network 128. The method may then end.

In contrast, the location multi-factor verification system operating on the mobile information handling system in an embodiment in which the mobile client information handling system has not received a boot up authorization instruction, or in which the rough geographical location of the mobile information handling system does not fall within the preset geographical area may abort the boot up process at block 420. For example, the mobile client information handling system 274 in an embodiment may provide a rough geographic location 314 to AP 304 indicating the mobile client information handling system 274 is located outside the preset geographical area 280. As another example, the mobile client information handling system 274 may provide a falsified rough geographic location 314 to AP 304 indicating the mobile client information handling system 274 is located within the preset geographical area 280. In both of these scenarios, because the AP 304 and gateway 302 are not operating the location multi-factor verification system and have not been provisioned with the private key provisioned to the AP's, routers and gateways within the local network 200 at block 402, the AP 304 and gateway 302 may be incapable of completing the asymmetric cryptography method described herein. Further, because the AP 304 and gateway 302 are not operating any portion of the location multi-factor verification system in an embodiment, neither the AP 304 nor the gateway 302 may transmit the boot up authorization instruction to the mobile information handling system 274. As such, the portion of the location multi-factor verification system in such an embodiment may stall the boot up process on the mobile client information handling system 274 while awaiting receipt of the boot up authorization instruction.

In some embodiments, if the authorization instruction is not received at the mobile client information handling system 274 within a preset time frame from initialization of the boot up process at block 406, the location multi-factor verification system operating on the mobile client information handling system 274 may abort the boot up process. In such a way, the location multi-factor verification system operating at the mobile information handling system and the access point of a local network may prohibit a user of the mobile information handling system operating outside of the preset geographical area from accessing the operating system of the mobile information handling system, the local network, or the secure network by circumventing the geofencing methods with a falsified geographic location.

The blocks of the flow diagrams of FIG. 4 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a wireless network access point operating a location multi-factor authentication security system comprising:
a memory storing a private key and a public key;
an access point network interface device operably connecting the wireless network access point to a network receiving a geographic location estimation from a client device requesting access to the network;

the access point network interface device transmitting a random number challenge generated using the private key to the client device if the geographic location estimation is within a preset geographical area;

the access point network interface device receiving a challenge response from the client device;

a processor generating a challenge response comparator by decrypting the random number challenge using a public key;

the processor generating a boot process authorization instruction if the challenge response matches the challenge response comparator; and the access point network interface device transmitting the boot process authorization instruction to the client device to permit access to the client device operating system if the challenge response matches the challenge response comparator.

2. The information handling system of claim 1, further comprising:

the access point network interface device disallowing communication between the network and the client device if the geographical location estimation is not within the preset geographical area.

3. The information handling system of claim 1, further comprising:

the access point network interface device transmitting a boot up abort instruction to the client device if the geographical location estimation is not within the preset geographical area.

4. The information handling system of claim 1, further comprising:

the access point network interface device transmitting a boot up abort instruction to the client device if the challenge response does not match the challenge response comparator.

5. The information handling system of claim 1, wherein the geographic location estimation is determined based on an access point beacon frame identifying an access point known to be located within the preset geographical area, received from the client device.

6. The information handling system of claim further comprising:

the processor authenticating the client device through a Wi-Fi Protected Setup (WPS) security protocol.

7. The information handling system of claim further comprising:

the access point network interface device receiving the public key and the private key transmitted from a router within a local network that includes the AP.

8. A location multi-factor verification method comprising:

initiating a boot process of a client device via firmware of the client device;

receiving, via a network interface device, an access point (AP) beacon frame identifying a nearby AP;

transmitting the AP beacon frame to a location determination service via the network interface device;

receiving a geographic location estimation from the location determination service, based on the AP beacon frame;

transmitting the geographic location estimation to the nearby AP; and granting a user of the client device access to an operating system of the client device if a boot process authorization instruction is received at the client device via the network interface device.

9. The method of claim further comprising:

receiving a boot up abort instruction, via the network interface device, if the geographical location estimation is not within the preset geographical area; and aborting the boot up process such that the user cannot access the operating system of the client device.

10. The method of claim 8, further comprising:

receiving a boot process authorization instruction from the nearby AP if the geographic location estimation is within a preset geographical area and the client device transmits a correct asymmetric cryptography challenge response to the AP.

11. The method of claim 10, further comprising:

receiving, via the network interface device, a random number challenge generated using the private key;

generating a challenge response based on a public key stored in a memory of the client device; and transmitting the challenge response to the AP via the network interface device.

12. The method of claim 10, further comprising:

receiving a boot up abort instruction, via the network interface device, if the client device does not transmit the correct asymmetric cryptography challenge response to the AP; and aborting the boot up process such that the user cannot access the operating system of the client device.

13. The method of claim 8, wherein the geographic location estimation is determined using a network connection triangulation method.

14. The method of claim 8, further comprising:

authenticating the client device at the AP through a Wi-Fi Protected Setup (WPS) security protocol, via the processor or network interface device.

15. An information handling system of a wireless network access point operating a location multi-factor authentication security system comprising:

a memory storing a private key and a public key;

an access point network interface device operably connecting the wireless network access point to a network receiving a geographic location estimation from a client device requesting access to the network;

a processor authenticating the client device through a Wi-Fi Protected Setup (WPS) security protocol;

the access point network interface device transmitting a random number challenge generated using the private key to the client device if the geographic location estimation is within a preset geographical area;

the access point network interface device receiving a challenge response from the client device;

a processor generating a challenge response comparator by decrypting the random number challenge using a public key;

the processor generating a boot process authorization instruction if the challenge response matches the challenge response comparator; and the access point network interface device transmitting the boot process authorization instruction to the client device to permit access to the client device operating system if the challenge response matches the challenge response comparator.

16. The information handling system of claim 15, further comprising:

the access point network interface device disallowing communication between the network and the client device if the geographical location estimation is not within the preset geographical area.

17. The information handling system of claim 15, further comprising:
the access point network interface device transmitting a boot up abort instruction to the client device if the geographical location estimation is not within the preset geographical area.

18. The information handling system of claim 15, further comprising:
the access point network interface device transmitting a boot up abort instruction to the client device if the challenge response does not match the challenge response comparator.

19. The information handling system of claim 15, further comprising:
the access point network interface device receiving the public key and the private key transmitted from a router within a local network that includes the AP.

20. The information handling system of claim 15, wherein the AP beacon frame identifies the nearby AP by a MAC address known to be associated with the nearby AP.

* * * * *